USO05544459A

United States Patent [19]

Konger

[11] Patent Number: 5,544,459
[45] Date of Patent: Aug. 13, 1996

[54] DUCT CHASE FRAME FOR JOISTS

[76] Inventor: Raymond J. Konger, 8732 Winchester Rd., Fort Wayne, Ind. 46819

[21] Appl. No.: 342,623

[22] Filed: Nov. 21, 1994

[51] Int. Cl.$^6$ ..................................................... E04C 2/52
[52] U.S. Cl. .......................... 52/220.3; 52/220.8; 52/480; 52/636
[58] Field of Search ............................... 52/220.1, 220.8, 52/690, 730.7, 220.3, 220.2, 220.6, 320.5, 480, 693, 694, 695, 696, 635, 636

[56] References Cited

U.S. PATENT DOCUMENTS

| | | | |
|---|---|---|---|
| 2,477,394 | 7/1949 | Spiker | 52/690 |
| 3,707,817 | 1/1973 | Schmitt et al. | 52/220.1 X |
| 4,937,998 | 7/1990 | Goldberg | 52/694 X |
| 5,058,352 | 10/1991 | Loiselle et al. | 52/696 X |

OTHER PUBLICATIONS

PCT WO94/10405, May 1994, Abstract.

*Primary Examiner*—Carl D. Friedman
*Assistant Examiner*—W. Glenn Edwards
*Attorney, Agent, or Firm*—Roger M. Rickert

[57] ABSTRACT

A duct chase frame is substituted for a portion of the length of a conventional wooden or metal floor joist to facilitate running hot or cold air ductwork, plumbing and even electrical wiring. The frame includes a pair of elongated metal channels of uniform cross-sectional configuration with two metal spacers spanning and maintaining a joist accepting separation between those channels. One of the spacers is generally U-shaped for receiving and cradling a lower edge of one end of a floor joist, and the other spacer has an inverted U-shape for engaging an upper edge of the floor joist in a location intermediate the joist ends. The inverted U-shaped support is located near a first end of the pair of metal channels and the U-shaped support is located intermediate the metal channel ends. There may be a second inverted U-shaped support near a second end of the pair of metal channels for maintaining the separation between the pair of channels and for receiving and supporting a floor nailer. Similar arrangements are made for providing ceiling nailers. When the duct chase frame is substituted for an intermediate portion of the length of a conventional wooden or metal floor joist, a second generally U-shaped spacer for receiving and cradling a lower edge of one end of one portion of the floor joist a third inverted U-shaped support are included.

7 Claims, 2 Drawing Sheets 5,544,459

DUCT CHASE FRAME FOR JOISTS

SUMMARY OF THE INVENTION

The present invention relates generally to multi-level building construction techniques, especially to floor or ceiling joists. More particularly, the present invention relates to a metal hanger which replaces a portion of the joist and provides space for heating and cold air return ducts, water pipes, wiring and the like to be run through the hanger perpendicular to the joist.

A common problem in houses and other buildings is a low ceiling or a ceiling with lowered portions, for example, in the basement. This is frequently due to the heating and cold air return ducts which can be run between floor joists in one direction parallel to the joists, but when run perpendicular to that direction, must be hung beneath the joists thus effectively lowering the ceiling by 8–10 inches.

One way around this problem is to use prefabricated trusses rather than solid 2"×10" or 2"×12" floor joists. Trusses are expensive and the challenge of running all the ductwork through the openings in the trusses is not always successfully overcome.

The present invention solves this problem by providing a metal hanger for a conventional joist which allows the ducts to be run through the hanger perpendicular to the joist.

Among the several objects of the present invention may be noted the provision of a duct chase frame which facilitates running ducts orthogonal to the joists of an otherwise conventionally framed floor; the provision of a metal hanger for a floor joist which allows heating, cold air return and similar ducts to be located above the lower edge of the joists; and the provision of a substitute for a portion of a floor joist which facilitates the installation of ducts. These as well as other objects and advantageous features of the present invention will be in part apparent and in part pointed out hereinafter.

In general, a two-portion construction beam has duct chase frame and joist portions with upper and lower edges. The duct chase frame portion includes a U-shaped channel and an inverted U-shaped channel for engaging the other joist portion. The U-shaped channel of the frame portion is located intermediate the inverted U-shaped channel and the other end of the frame portion. The frame portion includes a pair of hollow elongated steel channels, one on either side of the joist portion near the upper edge thereof. One end of the lower edge of the frame rests on a support. One end of the lower edge of the joist portion rests on another support. The other end of the joist portion is cradled in the U-shaped channel of the frame portion. The frame portion includes a transverse opening for the passage of ducts therethrough.

BRIEF DESCRIPTION OF THE DRAWING

FIG. 7 is a view in cross-section similar to FIG. 6, but illustrating a further modification of the present invention.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
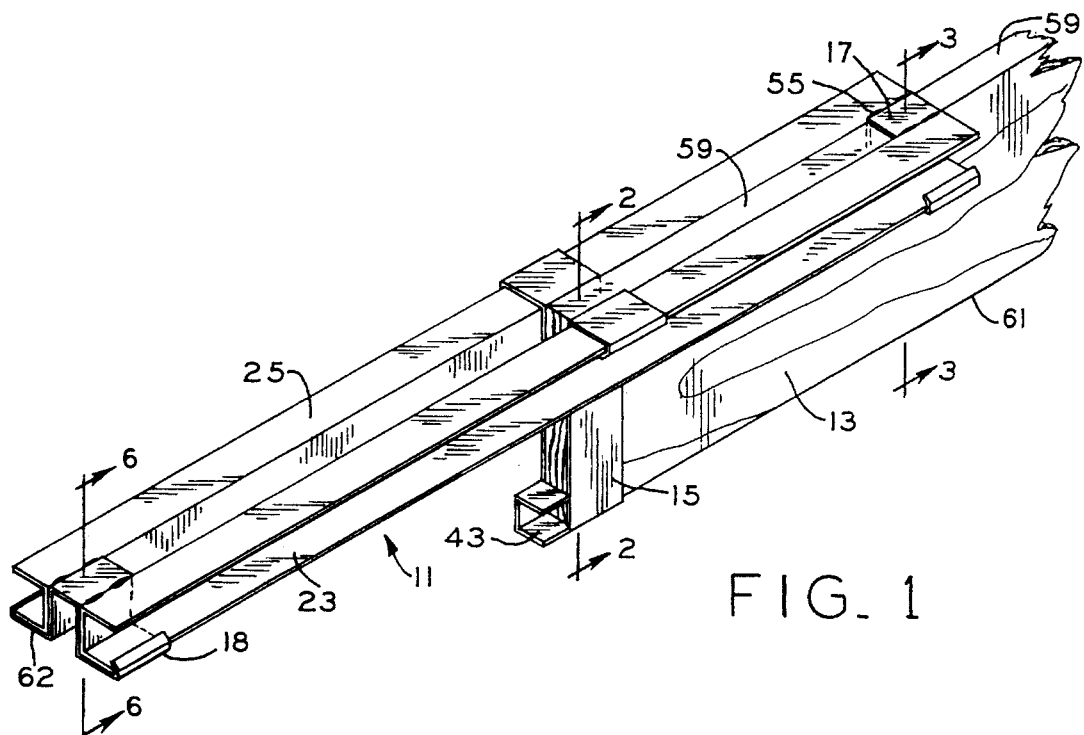
FIG. 1 is an isometric view of a duct chase frame and a portion of the corresponding joist.
Figure 2:
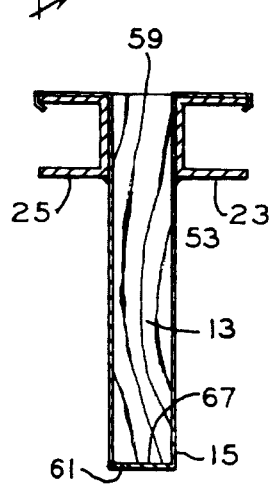
FIG. 2 is a view in cross-section along line 2—2 of FIG. 1.
Figure 3:
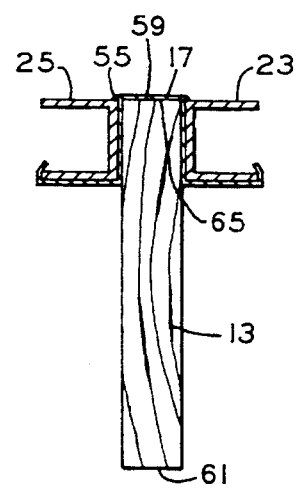
FIG. 3 is a view in cross-section along line 3—3 of FIG. 1.

The duct chase frame or hanger 11 is best seen in the isometric view of FIG. 1. The joist 13 rests in a U-shaped channel 15. An inverted U-shaped channel 17 engages an upper edge portion of the joist 13. A remote end (not shown) of the lower edge of joist 13 rests on a support such as an interior basement wall or a sill plate of the building foundation. One end of the hanger rests on another support such as the 2×4 stud 19 of FIG. 4. With the joist end cradled in the U-shaped channel 15 of the hanger, a transverse opening 21 (FIG. 4) which allows for the passage of heating, ventilating and air conditioning (HVAC) ductwork is created. Of course, in the typical installation, several joist hangers will be aligned to create a series of aligned openings 21. The joist 13 does not provide such an opening. With weight on the floor above, the joist is urged counterclockwise as viewed while the hanger is urged clockwise. This significant twisting moment is born (opposed) by the hanger portions 15 and 17.

Figure 5:
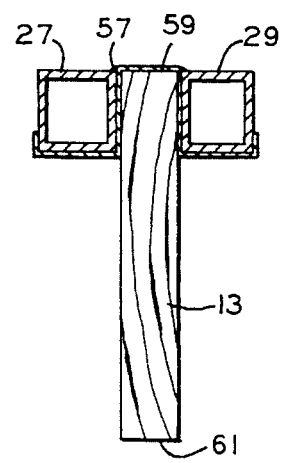
FIG. 5 is a cross-sectional view similar to FIG. 3, but showing one modification of the present invention.

The duct chase frame includes a pair of hollow elongated steel channels 23 and 25, one on either side of joist 13. These channels may be C-shaped as in FIGS. 1–4 and 6, or may take on other cross-sectional shapes such as the square tubes 27 and 29 of FIGS. 5 and 7 which provide somewhat greater strength. Of course, other shapes such as an I-beam or more exotic extruded cross-sectional shape may be employed. The channels are joined by three U-shaped or inverted U-shaped metal channels or supports 15, 17 and 18. Supports 17 and 18 may be identical to reduce manufacturing costs. Hanger 18 may, in some cases, be omitted as will appear more clearly from the subsequent discussion of FIG. 7. A number of welds may be added joining the tubular members and supports as at 53, 55, 57, 69, and 71 for enhanced strength if desired. Shipping considerations, however, may dictate omission of the welds since the parts may be easily assembled at the construction site.

The composite floor joist structure thus has two partially overlapping portions, the frame portion 11 and the joist portion 13. Only the frame portion allows passage of HVAC ducts. The structure has upper and lower edges 59 and 61 and extends between two support surfaces The portions overlap, that is, each portion has first and second ends with the first end of each portion disposed intermediate the first and second ends of the other portion. There is a first load bearing surface 63 on the lower edge 62 of the frame portion near a second end thereof for engaging one of the support surfaces, a second load bearing surface (not shown) on the lower edge of the joist portion near the second end thereof for engaging the other of the support surfaces, a third load bearing surface at 65 on the upper edge of the joist portion located intermediate the ends thereof, a fourth load bearing surface, again at 65, in the inverted U-shaped hanger portion near the first end of the frame portion for engaging the third load bearing surface, a fifth load bearing surface at 67 near the second end of joist portion, and a sixth load bearing surface at the bottom of the U-shaped hanger portion 15 of the frame intermediate the ends thereof for engaging the fifth load bearing surface.

Figure 4:
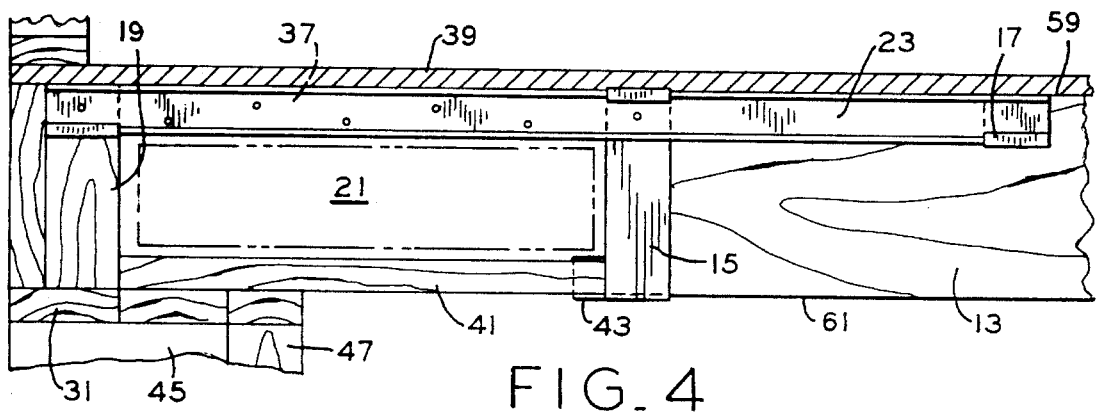
FIG. 4 is a side elevation view of the duct chase frame and joist of FIG. 1 as installed.
Figure 3:
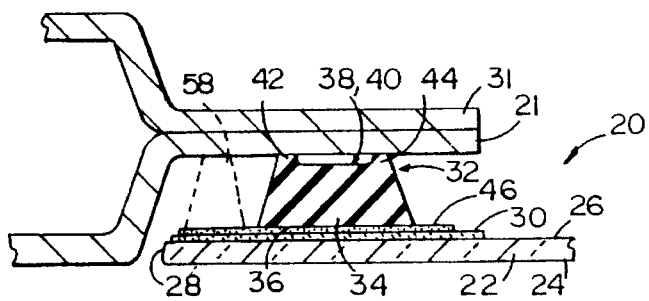

As seen in FIG. 4, the left end of the frame may be supported by a 2"×4" stud section 19 which is nailed to the sill plate 31. As an alternative, the 2"×4" could be integral with the hanger and nailed or pinned between a pair of metal support legs 33 and 35 as shown in FIG. 7. In FIG. 7, the load bearing surface 66 on the lower edge 64 of the frame portion is, like 63 in FIG. 6, located near a second end of the frame portion and is adapted to engage one of the support surfaces The extreme right end of the joist (not shown) may rest on a similar sill plate or on an interior load bearing wall.

The hanger 11 optionally accepts a 2"×2" or similar nailer 37 to provide for nailing flooring 39 on top and another 2"×2" or similar nailer 41 for hanging ceiling from below. Floor nailer 37 may be held in position between the channels 23 and 25 by resting on pins 49, by nails 51, or by similar fasteners. There is a small C-shaped metal clip 43 at the bottom of the U-shaped support 15 for receiving one end of the lower 2"×2" which may then be pivoted horizontally into its final position resting on top of the foundation 45 or an interior framed wall 47.

In one preferred embodiment, the hangers 15, 17 and 15 were formed from 3 inch wide 16 gauge steel while channels such as 23, 25, 27 and 29 were fabricated with about a 2" square cross-section from considerably thicker steel. The channels measured about 4 feet in their dissection of elongation and had about 1½ foot overlap common with the joist. The depth of the hanger portion 15 is dictated by the dimension of the joist and is the only part which has a dimension peculiar to a particular joist height. The remaining components would be common to 2"×12", 2"×10" or other joist size.

The method of utilization of the invention should now be clear. The floor joists are ordered or cut to a length 2 to 3 feet shorter than necessary to span the foundation or other support walls. One joist end is supported on the foundation or other wall by conventional techniques. The joist free end is inserted between the channels 23 and 25 with its lower edge cradled in the bracket 15 and with its upper edge engaged with the bracket 17. The other end of channels 23 and 25 in turn, rest on the foundation or other appropriate support. Nailers 41 and/or 37 may be pinned in position leaving the duct passing aperture 21 unobstructed.

Figure 8:
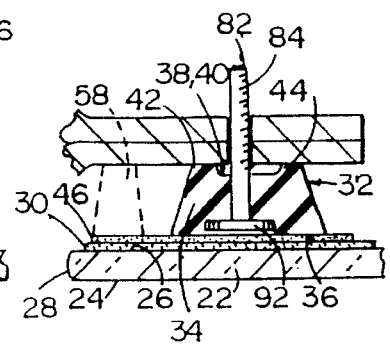
FIG. 8 is a side elevation view similar to FIG. 4, but showing yet another modification of the present invention.

In FIG. 8, a duct chase for facilitating the passage of ducts therethrough is provided away from the supporting walls by a frame which is adapted be substituted for an intermediate portion of the length of a conventional floor joist to provide a transverse opening 21 between two separated joist portions 73 and 75. As before, a pair of elongated metal channels 77 of uniform cross-sectional configuration extend along the upper edge of the joist portions. There are now at least four metal spacers spanning and maintaining a joist accepting separation between the pair of channels. Two of the spacers 79 and 81 comprise U-shaped supports for receiving and cradling respective lower edges of one end of each of the floor joist portions. Similarly, two other spacers 83 and 85 are inverted U-shaped supports for engaging upper edges of the floor joist portions in regions intermediate their respective ends. Additional strength is provided by the diagonals 87 and 89, and the horizontal lower member 88. Diagonals 87 and 89 may each comprise a pair of flat metal straps, one to either side of the joist. Horizontal member 88 may similarly comprise a pair of flat metal straps, or may be a U-shaped channel which is concave upwardly as desired. With a load on the floor above, the members 87, 88 and 89 are in tension while the metal channels 77 are in compression.

In summary, the invention has a number of advantages over known prior techniques paramount of which, because of the duct chase, is the installation above the lower edge of the joists of HVAC ducts which run perpendicular to the joists.

From the foregoing, it is now apparent that a novel duct chase frame which functions as a hanger for one end of a floor or ceiling joist has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A composite floor joist structure having two partially overlapping portions only one of which allows passage therethrough of HVAC ducts, said joist structure having upper and lower edges and adapted to extend between two support surfaces, said portions each having first and second ends with the first end of each portion disposed intermediate the first and second ends of the other portion, said joist structure further comprising:

a first load bearing surface on the lower edge of said one portion for engaging one of said support surfaces;

a second load bearing surface on the lower edge of the other of said portions for engaging the other of said support surfaces;

a third load bearing surface on the upper edge of the other of said portions located intermediate the ends thereof;

a fourth load bearing surface near the first end of said one portion for engaging said third load bearing surface;

a fifth load bearing surface on the lower edge of the other portion and near the second end of said other portion; and a sixth load bearing surface on said one portion intermediate the ends thereof for engaging said fifth load bearing surface.

2. A two-portion beam having upper and lower edges, one portion including a U-shaped channel and an inverted U-shaped channel for engaging the other portion and with one end of the lower edge thereof resting on a support, one end of the lower edge of the other portion resting on another support and the other end of said other portion being cradled in the U-shaped channel of said one portion, the U-shaped channel of said one portion located intermediate said one end and the inverted U-shaped channel, said one portion having a transverse opening for the passage of ducts therethrough.

3. The beam of claim 2 wherein the one portion includes a pair of hollow elongated steel channels, one on either side of the other portion near the upper edge thereof.

4. A duct chase frame which may be substituted for a portion of the length of a conventional floor joist to provide a transverse opening for facilitating the passage of ducts therethrough comprising:

a pair of elongated metal channels of uniform cross-sectional configuration; and at least two metal spacers spanning and maintaining a joist accepting separation between the pair of channels;

one spacer comprising a U-shaped support for receiving and cradling a lower edge of one end of a floor joist near one end thereof, and another spacer comprising an inverted U-shaped support for engaging an upper edge of the floor joist in a region intermediate the ends thereof.

5. The duct chase frame of claim 4 wherein the duct chase frame is adapted be substituted for an intermediate portion of the length of a conventional floor joist to provide a transverse opening between two separated joist portions for facilitating the passage of ducts therethrough and further includes at least two further metal spacers spanning and maintaining a joist accepting separation between the pair of channels, one of the further spacers comprising a U-shaped support for receiving and cradling a lower edge of one end of a portion of the floor joist, and another further spacer comprising an inverted U-shaped support for engaging an upper edge of the portion of the floor joist in a region intermediate the ends thereof.

6. The duct chase frame of claim 4 wherein the U-shaped support includes a ceiling nailer accepting and supporting portion near the lower edge thereof.

7. The duct chase frame of claim 4 wherein said inverted U-shaped support is located near a first end of the pair of metal channels and the U-shaped support is located intermediate the metal channel ends, the frame further comprising a second inverted U-shaped support near a second end of the pair of metal channels for maintaining the separation between the pair of channels and for receiving and supporting a floor nailer.

* * * * *

UNITED STATES PATENT AND TRADEMARK OFFICE
CERTIFICATE OF CORRECTION

PATENT NO. : 5,544,459
DATED : August 13, 1996
INVENTOR(S) : Raymond J. Konger

Figure 6:
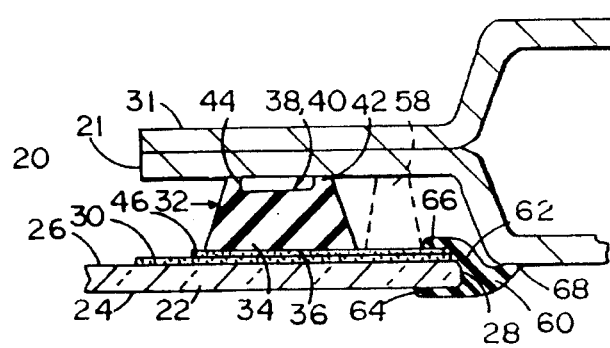
FIG. 6 is a view in cross-section along line 6—6 of FIG. 1, additionally showing the sub-floor nailer of FIG. 4 in position.
Figure 2:
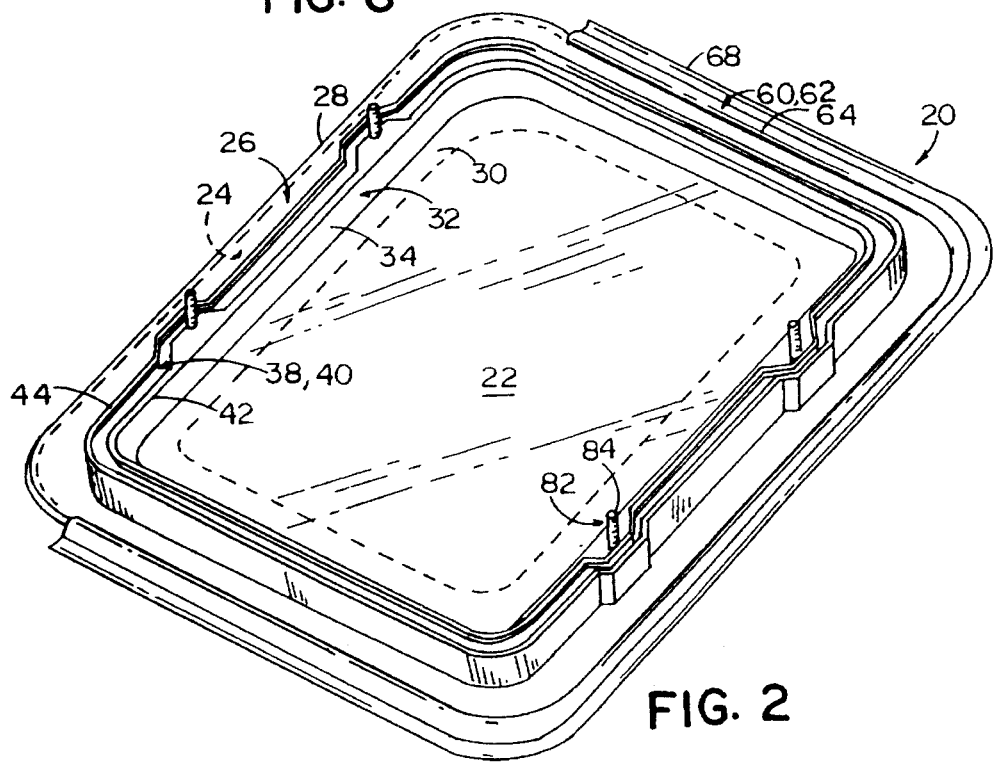

It is certified that error appears in the above-indentified patent and that said Letters Patent is hereby corrected as shown below:

Delete Drawing sheet 2 of 2, and substitute therefor the Drawing sheet, consisting of FIGS. 6,7 and 8, as shown on the attached page.

Signed and Sealed this

Eleventh Day of February, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,544,459　　　　　　　　　　　　　　Page 2 of 2
DATED     : August 13, 1996
INVENTOR(S): Raymond J. Konger It is certified that error appears in the above-indentified patent and that said Letters Patent is hereby corrected as shown below:

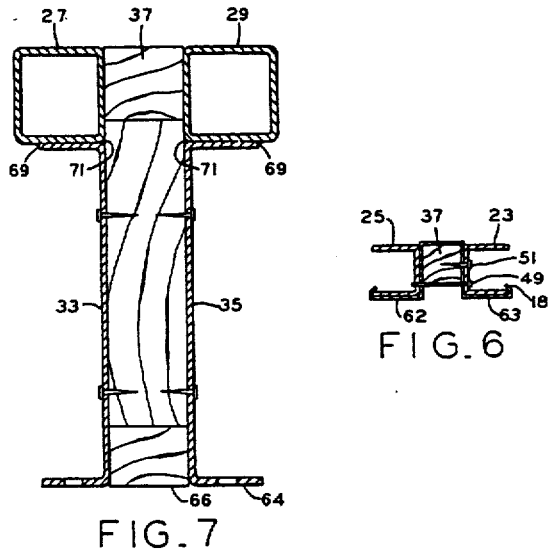

FIG. 6

FIG. 7

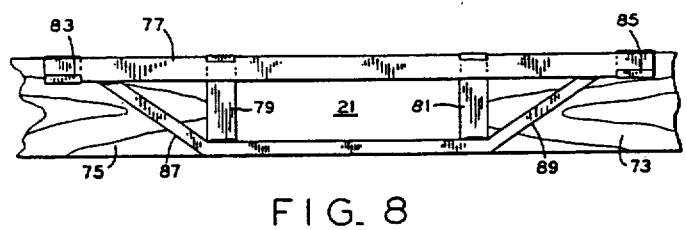

FIG. 8